(12) United States Patent
Hashizume et al.

(10) Patent No.: US 11,673,572 B2
(45) Date of Patent: Jun. 13, 2023

(54) VEHICLE CONTROL APPARATUS

(71) Applicant: HONDA MOTOR CO., LTD., Tokyo (JP)

(72) Inventors: Takashi Hashizume, Wako (JP); Ryuichi Kimata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 278 days.

(21) Appl. No.: 16/999,629

(22) Filed: Aug. 21, 2020

(65) Prior Publication Data

US 2021/0061302 A1 Mar. 4, 2021

(30) Foreign Application Priority Data

Sep. 2, 2019 (JP) .............................. JP2019-159687

(51) Int. Cl.
*B60W 60/00* (2020.01)
*B60W 30/18* (2012.01)
*B60W 40/13* (2012.01)

(52) U.S. Cl.
CPC .... *B60W 60/001* (2020.02); *B60W 30/18009* (2013.01); *B60W 40/13* (2013.01); *B60W 2040/1315* (2013.01)

(58) Field of Classification Search
CPC ......... B60W 60/001; B60W 30/18009; B60W 40/13; B60W 2040/1315; B60W 2530/00; B60W 2720/106; B60W 2720/125; G05D 2201/0213; G05D 1/0223; B60K 28/08
See application file for complete search history.

(56) References Cited

U.S. PATENT DOCUMENTS

| 8,165,771 | B2 | 4/2012 | Doi | |
| 9,358,975 | B1* | 6/2016 | Watts | G05D 1/0011 |
| 11,029,695 | B2* | 6/2021 | Pajevic | G05D 1/027 |
| 2007/0084450 | A1* | 4/2007 | Oka | B60K 28/08 |
| | | | | 123/675 |
| 2008/0201044 | A1* | 8/2008 | Yamada | B66F 17/003 |
| | | | | 701/50 |
| 2008/0208416 | A1* | 8/2008 | Yuet | B60W 30/04 |
| | | | | 340/440 |

(Continued)

FOREIGN PATENT DOCUMENTS

| JP | H09-160640 A | 6/1997 |
| JP | 2008-056067 A | 3/2008 |
| JP | 2019-131374 A | 8/2019 |

OTHER PUBLICATIONS

Japanese Office Action for Japanese Patent Application No. 2019-159687 dated Aug. 22, 2022 (partially translated).

*Primary Examiner* — Peter D Nolan
*Assistant Examiner* — Peter Y Ning
(74) *Attorney, Agent, or Firm* — Thomas | Horstemeyer, LLP

(57) ABSTRACT

A vehicle control apparatus is provided. The vehicle control apparatus comprises a load unit for loading a load; a weight sensor for estimating a position of a center of mass of the load; a drive unit; and a control unit for controlling autonomous travelling of a vehicle by controlling the drive unit, wherein the control unit estimates a position of the center of mass of the load based on a weight measured by the weight sensor, and controls an acceleration rate of the vehicle in accordance with the position of the center of mass.

6 Claims, 8 Drawing Sheets

(56) References Cited

U.S. PATENT DOCUMENTS

| | | |
|---|---|---|
| 2010/0145576 A1 | 6/2010 | Doi |
| 2012/0209502 A1* | 8/2012 | Nichols ................ B62D 53/021 |
| | | 701/124 |
| 2017/0043988 A1* | 2/2017 | Lee .......................... B66F 9/22 |
| 2017/0183155 A1* | 6/2017 | Kazama ............... G05D 1/0223 |
| 2019/0294175 A1* | 9/2019 | Pajevic ............ G05B 19/41895 |
| 2020/0071144 A1* | 3/2020 | Draayer ................ B66F 9/0755 |
| 2020/0264064 A1* | 8/2020 | Iwama ................. B60G 17/052 |
| 2022/0155130 A1* | 5/2022 | Laine ................... G01G 19/021 |

* cited by examiner

VEHICLE CONTROL APPARATUS

CROSS-REFERENCE TO RELATED APPLICATION

This application claims priority to and the benefit of Japanese Patent Application No. 2019-159687 filed on Sep. 2, 2019, the entire disclosure of which is incorporated herein by reference.

BACKGROUND OF THE INVENTION

Field of the Invention

The present invention relates to a vehicle control apparatus for controlling, for example, a vehicle that travels autonomously.

Description of the Related Art

An unmanned transport vehicle that transports freight without a driver has been proposed (see, for example, Japanese Patent Laid-Open No. 09-160640). This unmanned transport vehicle travels autonomously and stops at a target position in a state where freight is loaded thereon. Also, the unmanned transport vehicle of Japanese Patent Laid-Open No. 09-160640 decelerates when a magnetic horizontal component is detected, and stops when a magnetic vertical component is detected, with use of a stop position detection sensor provided on a lower part of a vehicle body.

However, with the technique described in Japanese Patent Laid-Open No. 09-160640, deceleration and stopping need to be set separately in order to prevent collapsing of freight when stopping. Furthermore, it does not address collapsing of freight when taking off, when aiming, when travelling uphill, and when travelling downhill.

SUMMARY OF THE INVENTION

The present invention provides a vehicle control apparatus that prevents collapsing of freight in accordance with a variety of situations in which freight has a possibility of collapsing.

The present invention includes the following configuration. Specifically, according to one aspect of the present invention, provided is a vehicle control apparatus, comprising: a load unit for loading a load; a weight sensor for estimating a position of a center of mass of the load; a drive unit; and a control unit for controlling autonomous travelling of a vehicle by controlling the drive unit, wherein the control unit estimates a position of the center of mass of the load based on a weight measured by the weight sensor, and controls an acceleration rate of the vehicle in accordance with the position of the center of mass.

Furthermore, according to another aspect of the present invention, provided is a vehicle control apparatus, comprising: a load unit for loading a load; a weight sensor for estimating a position of a center of mass of the load; a drive unit; and a control unit for controlling autonomous travelling of a vehicle by controlling the drive unit, wherein the control unit estimates a position of the center of mass of the load based on a weight measured by the weight sensor, and controls a direction of movement when the vehicle travels uphill or downhill on an inclination in accordance with the position of the center of mass.

According to the present invention, collapsing of freight can be prevented in accordance with a variety of situations in which freight has a possibility of collapsing.

Further features of the present invention will become apparent front the following description of exemplary embodiments with reference to the attached drawings.

DESCRIPTION OF THE EMBODIMENTS

Figure 1A:
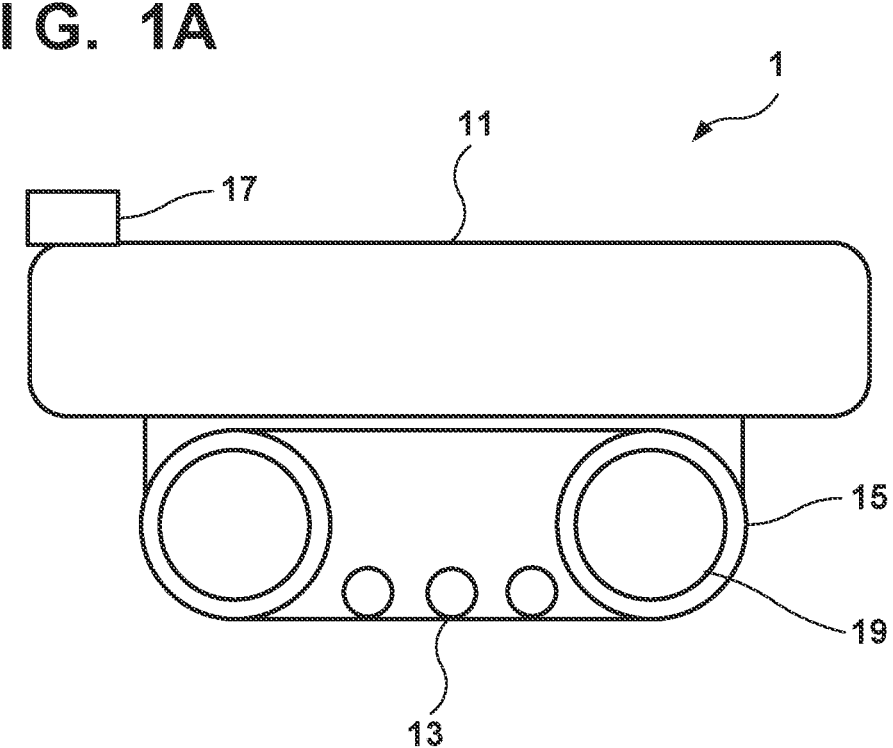
FIG. 1A and FIG. 1B are external views of a vehicle according to an embodiment as viewed from the side.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Configuration of Vehicle

Figure 1B:
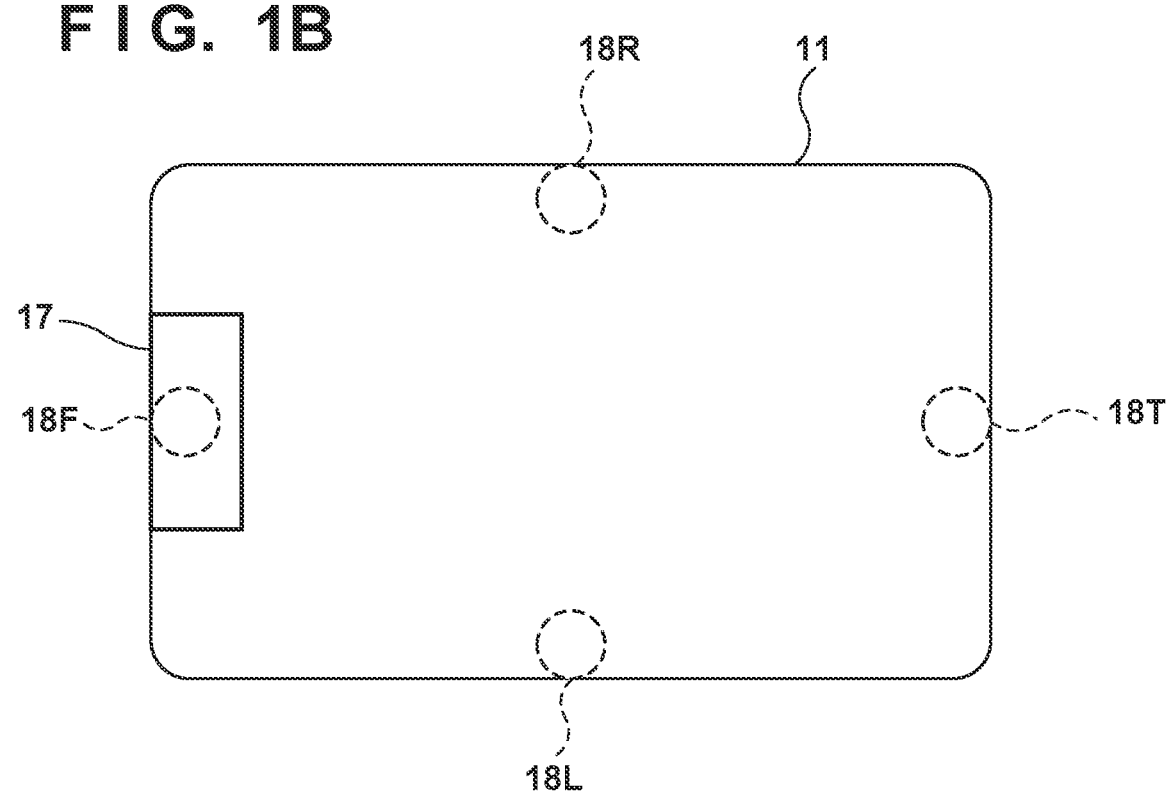
Figure 2:
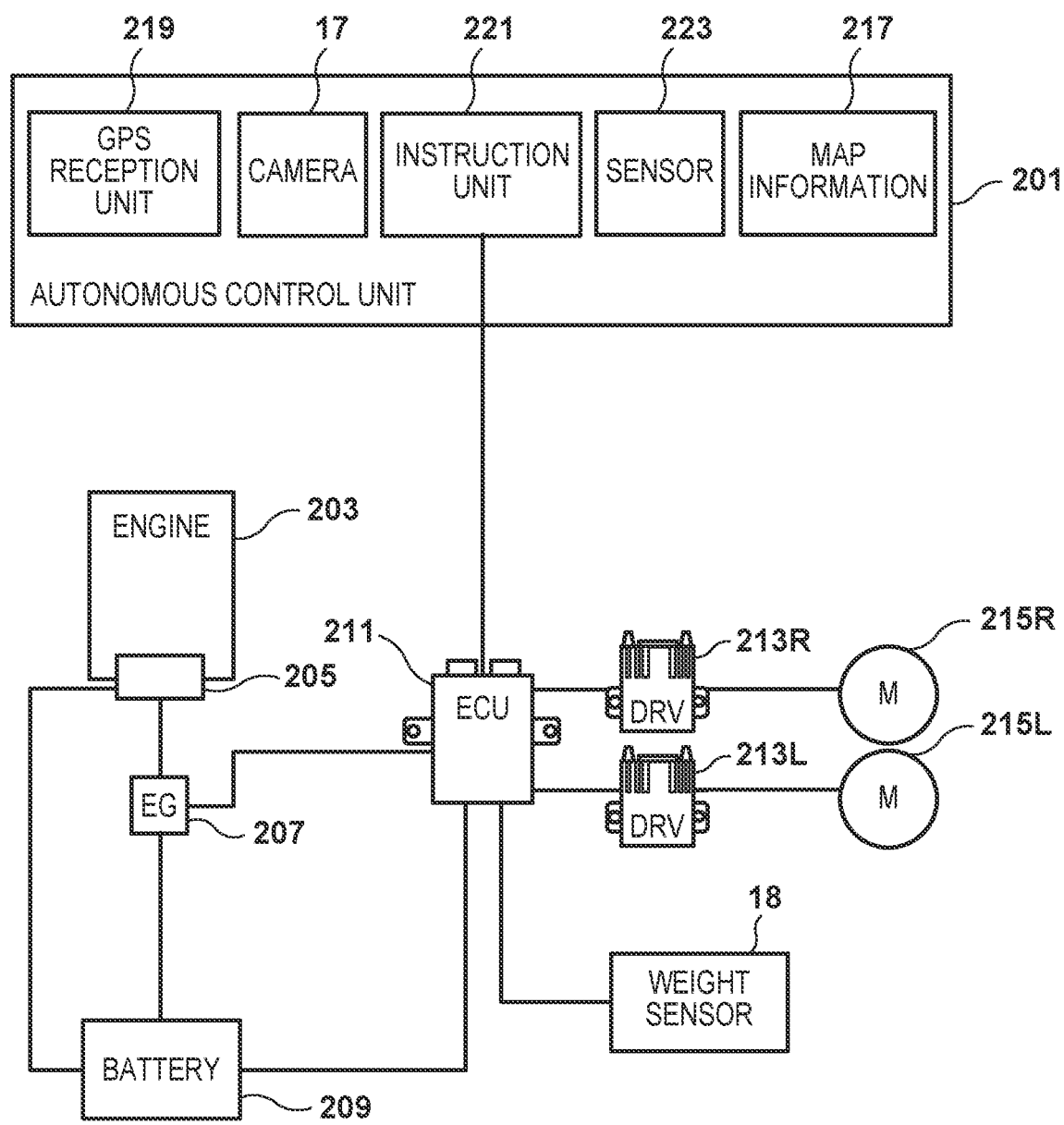
FIG. 2 is a block diagram showing a control configuration of the vehicle according to an embodiment.

FIG. 1A and FIG. 1B are respectively a side view and a top view of an autonomously-travelling vehicle 1 (hereinafter may be referred to simply as a vehicle 1) according to the present embodiment. The vehicle 1 according to the present embodiment is a tracked vehicle including a main body 11, which has a control unit, a motive power source, and the like built therein, and a crawler 15. The crawler 15 is composed of sprocket wheels 19 that are driven by the motive power source, a crawler belt 13 that is driven by the sprocket wheels 19, and so forth. Furthermore, the main body 11 includes a camera 17 that shoots a certain range centered at the direction of movement, and shot images are used in travel control. That is to say, the camera 17 functions as an external information obtainment unit that obtains information of the outside of the vehicle 1. A control system and a drive system shown in FIG. 2 are housed in the main body 11. The vehicle 1 is a hybrid vehicle that uses a combination of an engine, which is an internal combustion engine, and electric motors as its drive system, generates electricity using the engine, and drives the electric motors using this electricity. In the present example, the vehicle 1 is structured in such a manner that it can travel autonomously in an unmanned state, and freight can be loaded on its upper part. Therefore, members for fixing the loaded freight (load) in place, a fall-prevention cage, and the like may be provided; these, however, are omitted in FIG. 1A and FIG. 1B.

Furthermore, a board for the purpose of loading is provided on a top surface, and four weight sensors 18R, 18L, 18F, 18T (may be collectively referred to as weight sensors 18) are provided therebelow. Based on the direction of movement, the weight sensors 18R, 18L are respectively provided on the right and left of a central portion in the front-and-rear direction, whereas the weight sensors 18F, 18T are respectively provided on the front and rear of a central portion in the left-and-right direction. Therefore, the weight sensors 18 can not only detect a total weight of the loaded freight, but also detect weight balance in the front-and-rear direction and the left-and-right direction. Balance in the front-and-rear direction is indicated by the difference between weights that were respectively detected by the weight sensors 18F, 18T, whereas balance in the left-and-right direction is indicated by the difference between weights that were respectively detected by the weight sensors 18F, 18R.

FIG. 2 is a block diagram of the vehicle 1. Autonomous travelling is realized by an autonomous control unit 201 controlling the drive system. First, the drive system will be described. An engine 203 is an internal combustion engine that generates electricity by driving a generator 205. Note that the generator 205 also functions as a starter motor for the engine 203. The engine rotation is controlled by an electronic governor 207 under control of an ECU 211. A battery (secondary battery) 209 is charged with the electricity generated by the generator 205. The electricity stored in the battery 209 is supplied to each of motors 215R, 215L via drivers 213R, 213L. The motors 215R, 215L respectively drive the right and left sprocket wheels 19. The drivers 213R, 213L control electric current supplied to the corresponding motors 215R, 215L. When the motors 215R, 215L are, for example, three-phase induction motors, the drivers 213R, 213L may include an inverter that converts direct current from the battery into alternating current. Accordingly, the rotation speed and torque of each sprocket wheel 19 may be controlled by changing the voltage and frequency of alternating current in accordance with control performed by the ECU 211.

The left and right motors and drivers are independent of one another, and can drive the left and right sprocket wheels 19 independently of each other. It goes without saying that, even when other types of motors are used, the torque and speed thereof can be controlled by adopting drivers that are appropriate therefor. The vehicle 1 turns left or right due to the rotation difference between the left and right motors 215R, 215L; thus, the ECU 211 controls the motors 215R, 215L in accordance with control performed by the autonomous control unit 201, and achieves the speed and steering corresponding to an instruction. The ECU 211 also generates electricity as necessarily by controlling the state of operation (e.g., stopping and starting) of the engine 203. Note that in the present embodiment, it is assumed that charging of the battery is controlled by the ECU 211. Although there is one ECU 211 in FIG. 2, it is permissible to adopt a configuration in which a plurality of independent ECUs are provided in accordance with objects to be controlled, and these are coordinated by one ECU. To this end, the ECU 211 can execute, for instance, a program having a procedure that is exemplarily shown in FIG. 4. Furthermore, the four weight sensors 18 shown in FIG. 1B (collectively shown in FIG. 2) are connected to the ECU 211, and the detected weights are input to the ECU 211.

Next, the autonomous control unit 201 will be described. A GPS reception unit 219 is one example of a position detection device that receives signals from a GPS satellite and inputs them to the ECU 211. Alternatively, the GPS reception unit 219 may specify the current position, and input the specified current position to the ECU 211. A camera 17, which is the same as the camera 17 of FIG. 1A and FIG. 1B, shoots images in the direction of movement (also called the front), and monitors obstacles, signs, and so forth. When the camera 17 is a stereo camera, the distance to a target can be estimated based on parallax. This makes it possible to estimate an inclination, especially an uphill inclination, in the direction of movement. In addition, cameras for monitoring the rear and the sides may be further provided. Sensors 223 may include various types of sensors, and these sensors may include, for example, sensors that are necessary for control, such as an azimuth sensor, an inclination sensor, an acceleration rate sensor, and so forth. It goes without saying that not only the sensors that have been exemplarily described, but also necessary sensors can be included.

Map information 217 is, for example, map information that is stored in a nonvolatile memory, such as a rewritable ROM and a hard disk, and covers a region in which the vehicle 1 is used, and may include information related to paths and facilities along which the vehicle 1 travels, obstacles, sections of the region, and so forth. The sections of the region include an engine operation prohibition area and an engine operation permission area, which will be described later. It is permissible to set only an engine operation prohibition area and regard other areas as engine operation permission areas; conversely, it is permissible to set only an engine operation permission area and regard other areas as engine operation prohibition areas. Furthermore, the map information may include the gradient (inclination) of a path. The gradient may indicate a direction; however, in the present example, it is assumed that only the value of the inclination is included, and the direction of the inclination may not be included. Note that engine operation refers to the act of putting the engine 203, which is the internal combustion engine, in motion, and an engine operation prohibition area refers to an area in which the engine 203 must not be operated. Once a destination has been set via, for example, an operation unit and a communication unit, which are not shown, the autonomous control unit 201 determines a path from the current location to the destination based on the map information 217, and controls a drive unit so as to travel along this path.

An instruction unit 221 determines a speed and a steering angle based on, for example, the current position obtained from the GPS reception device 219, the status of the surroundings of the vehicle 1 that has been obtained using the camera 17, various types of sensors 223, and the like, a travel path that has been determined, and the map information 217, and inputs an instruction signal to the ECU 211 of the drive system. Upon accepting the instruction signal, the ECU 211 controls the motors 215R, 215L to achieve the speed and the steering angle of the instruction.

Outline of Autonomous Travelling

Figure 3A:
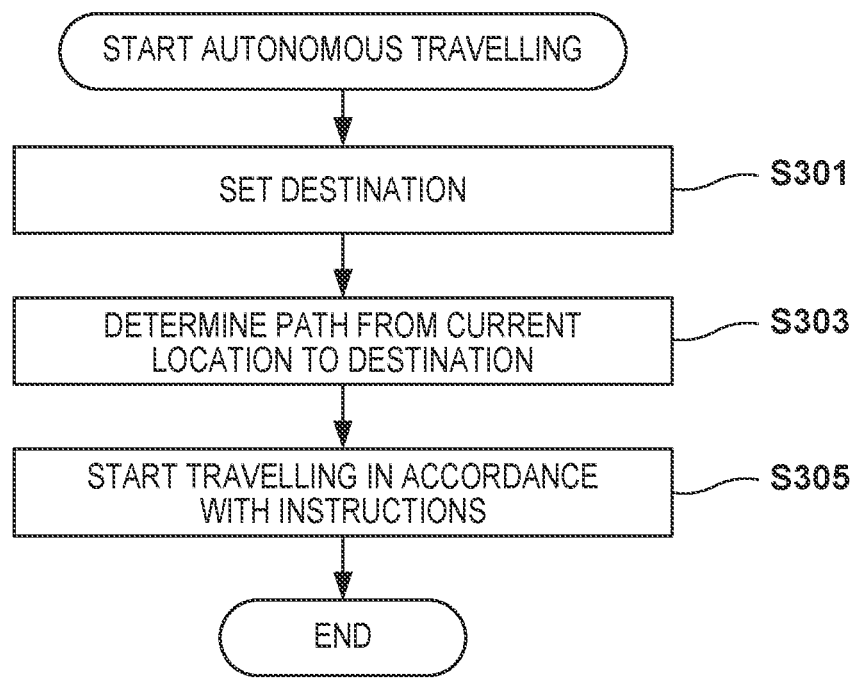
FIG. 3A is a diagram showing an exemplary procedure of autonomous travelling of the vehicle according to an embodiment.

FIG. 3A shows an outline of a procedure at the time of autonomous travelling of the vehicle 1. This procedure is executed by the autonomous control unit 201, especially the instruction unit 221. First, the setting of a destination that has been made by an operator via the operation unit 201 is accepted (step S301). The setting of the destination may be made by, for example, displaying a map of the vicinity of the current location, and causing the destination to be designated on the map or to be designated using coordinates, houses that are displayed, and the like. The instruction unit 221 determines the current location from GPS signals received by the GPS reception unit 219, and determines a path from the current location to the destination (step S303). As the path, for example, a path along a road (or an aisle) may be determined. Also, a path corresponding to the designated destination may be determined from among paths that have been defined in advance for respective destinations. Then, in response to an instruction to start travelling, an instruction signal is input to the ECU 211 so as to drive the motors 215R, 215L, and travelling along the determined path is started (step S305). During travel, the GPS reception unit 219 obtains position information of the current location (the current position), and the direction of movement is controlled so as to travel along the determined path. Furthermore, the camera 17 monitors the surroundings centered at the direction of movement; if an obstacle is discovered, control is performed so as to avoid the obstacle, stop, or decelerate.

Figure 3B:
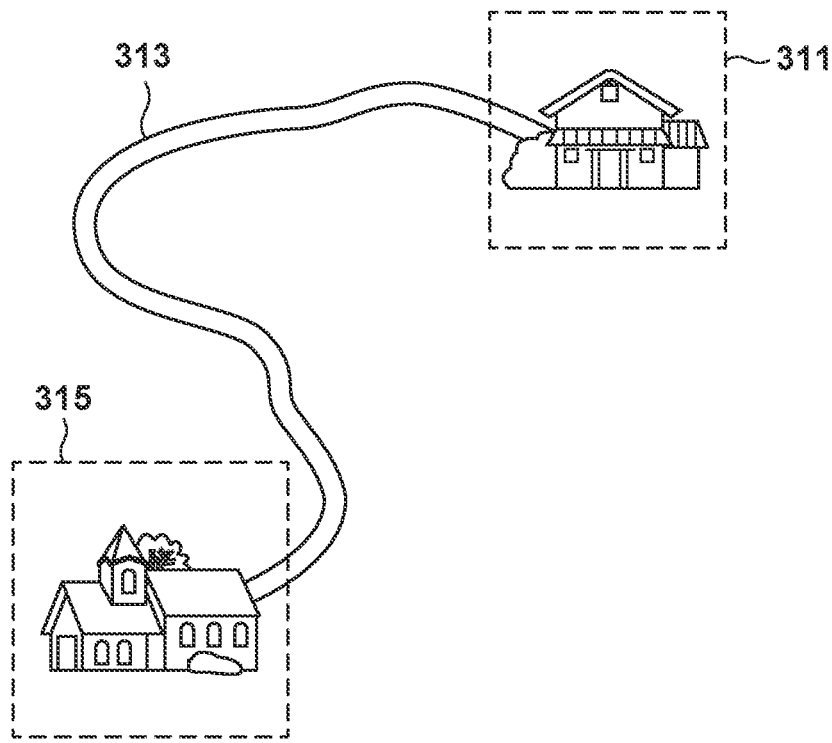
FIG. 3B is a diagram showing a schematic example of map information according to an embodiment.

FIG. 3B shows an example of a path at has been determined based on the map information 217. A destination 311 is the destination that was set in step S301. A current location 315 is the current location that was obtained in step S303, and a path 313 is the path that connects the current location 315 and the destination 311 in the map information 217. In determining the path, it is sufficient to select, for example, the shortest path among the roads (or aisles) that connect the current location and the destination, or a path that has been determined in advance in correspondence with the destination. Here, as the path 313 is not necessarily a public road and the vehicle 1 is a vehicle that has the crawler instead of wheels, a curve and an inclination that cause collapsing of freight could possibly exist midway through the path 313.

In view of this, the vehicle 1 checks the center of mass of freight loaded on the vehicle 1 using the weight sensors; upon issuance of an instruction for an action that can cause collapsing of freight, or when travelling on an inclination that can cause collapsing of freight is scheduled, precautionary control for preventing collapsing of freight is performed. This control includes limiting the acceleration rate in the longitudinal direction when taking off and when stopping, limiting the acceleration rate in the widthwise direction when turning, and moving the position of the center of mass when travelling uphill and when travelling downhill. Limiting the acceleration rate in the longitudinal direction when taking off and when stopping specifically includes preventing a sudden takeoff and sudden stopping. Limiting the acceleration rate in the widthwise direction when turning includes limiting the turning radius and limiting the turning speed. Moving the position of the center of mass when travelling uphill and when travelling downhill includes reversing the direction of movement. Note that in the present embodiment, the vehicle 1 includes two heavy goods, that is to say, the engine and the battery, and is assumed to be configured in such a manner that the position of the center of mass is located at the center of the vehicle by balancing these heavy goods. Furthermore, arranging a fuel tank of the engine at the center of the vehicle can prevent the center of mass from moving due to an increase and a decrease in the fuel tank, and it is assumed that this configuration is adopted in the present example. That is to say, in the vehicle 1, the center of mass is at the center of the vehicle in an unladen state, and the imbalance of the position of the center of mass depends on the state of loaded freight.

Setting of Limitation on Acceleration Rate

Figure 4:
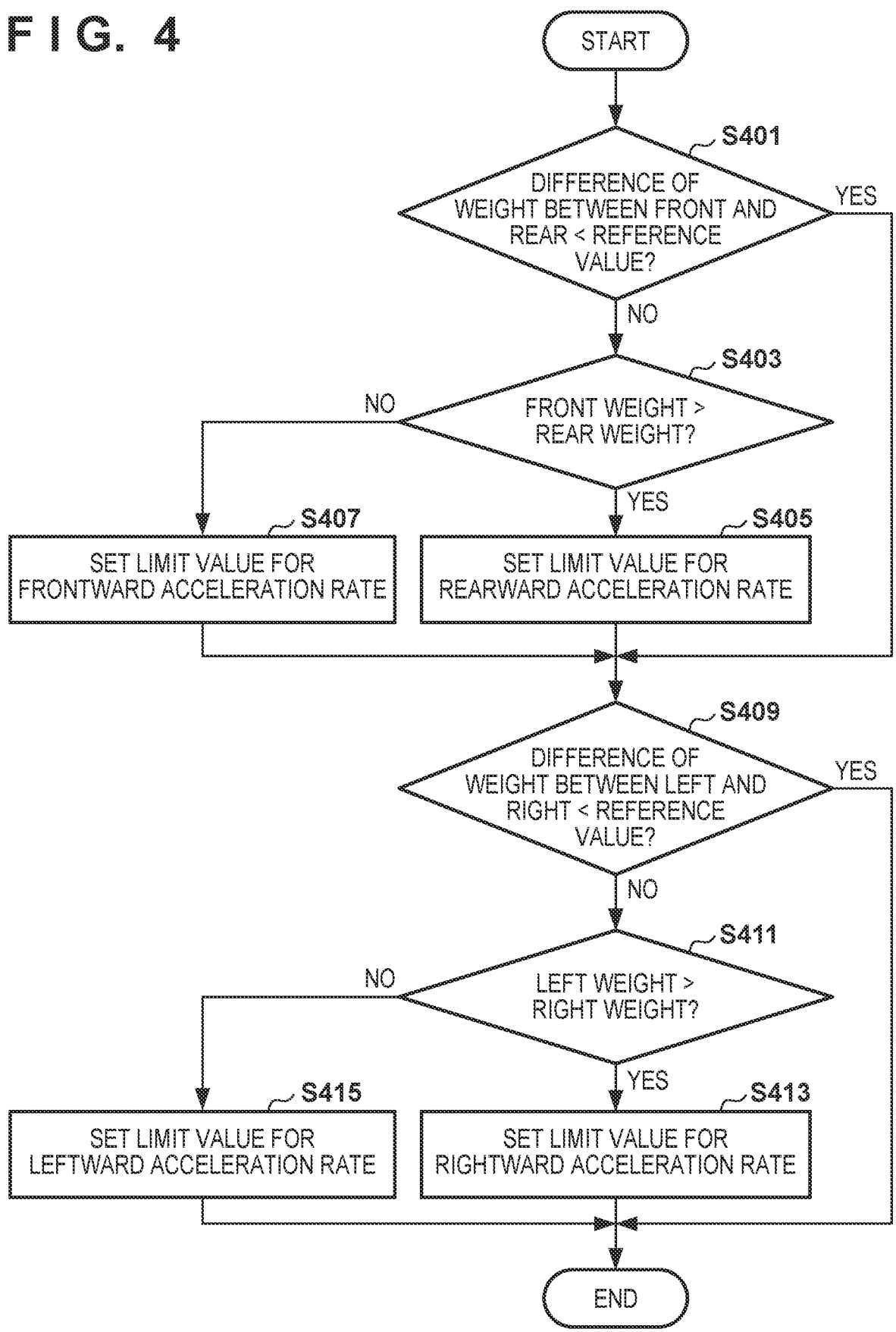
FIG. 4 is a flowchart showing an example of setting of a limit value for an acceleration rate of the vehicle according to an embodiment.

FIG. 4 shows a control procedure according to the present embodiment, which is executed by the ECU 211 immediately before the vehicle 1 takes off. This procedure may be executed immediately before starting a takeoff action when a takeoff instruction has been issued to the vehicle 1. First, the four weight sensors 18 obtain their respective loads (weights), and among these, whether the difference between the values that were respectively detected by the weight sensor 18F at the front of the vehicle and the weight sensor 18T at the rear of the vehicle is smaller than a reference value is determined (step S401). Here, the reference value is a value indicating that the center of mass of freight is substantially at the center in the front-and-rear direction of the vehicle, and may be determined experimentally, for example. Furthermore, as the tolerated difference increases with an increase in the weight of freight, in step S401, "the weight difference between the front and the rear/the weight of freight" may be obtained and the value thereof may be compared with the reference value, rather than the weight difference between the front and the rear per se. The weight of freight may be, for example, the sum of the values of the four weight sensors. The following description will be given under the assumption that, as in FIG. 4, the difference between the weights that were respectively detected by the front and rear weight sensors, per se, is compared with the reference value in step S401.

When it is determined that the weight difference between the front and the rear is equal to or larger than the reference value in step S401, whether the front weight exceeds the rear weight is determined (step S403). When the front weight exceeds the rear weight, that is to say, when the center of mass is on the front side, a limit value for a rearward acceleration rate is set (step S405). On the other hand, when the front weight does not exceed the rear weight, that is to say, when the center of mass is on the rear side, a limit value for a frontward acceleration rate is set (step S407). Note that once the difference between the front weight and the rear weight has been obtained, the center of mass on the front side and the center of mass on the rear side are expressed with a positive or negative sign, and thus it is sufficient to set the limit value for the acceleration rate in accordance with the value of the difference. A specific value of the limit value for the acceleration rate may be set experimentally, for example. The same goes for left and right. Note that left and right denote the direction perpendicular to the direction of movement of the vehicle; in the present example, they refer to left and right while facing the front of the vehicle.

Next, whether the difference between the weights that were respectively detected by the left and right weight sensors is smaller than the reference value is determined (step S409). When it is determined that the weight difference between left and right is equal to or larger than the reference value in step S409, whether the left weight exceeds the right weight is determined (step S411). When the left weight exceeds the right weight, that is to say, when the center of mass is on the left side, a limit value for a rightward acceleration rate is set (step S413). On the other hand, when the left weight does not exceed the right weight, that is to say, when the center of mass is on the right side, a limit value for a leftward acceleration rate is set (step S415). Note that once the difference between the left weight and the right weight has been obtained, the center of mass on the left side and the center of mass on the right side are expressed with a positive or negative sign, and thus it is sufficient to set the limit value for the acceleration rate in accordance with the value of the difference. Note that the leftward/rightward acceleration rate results from, for example, a centripetal force during a turn. In order to limit this centripetal force, the turning radius and the speed are limited. Based on the mass m, the speed v, and the turning radius r of the vehicle 1, the centripetal force F is represented as $F=mv^2/r$. Based on $F=ma$, the acceleration rate a resulting from the centripetal force F is represented as $a=v^2/r$. Provided that a limit value for the acceleration rate a is $a_{lmt}$, $r=v^2/a_{lmt}$ is obtained from the speed v during travel. In view of this, in steps S413 and S415, a correspondence table of the speeds v and the radii r corresponding to the limit values for the acceleration rates may be set at an interval of, for example, predetermined speeds, instead of the limit values for the acceleration rates.

In the foregoing manner, the limit values for the acceleration rates in respective directions can be set as necessary. The limit values for the acceleration rates that have been set in the foregoing manner are referred to during acceleration, deceleration, and a leftward/rightward turn so as to control travelling of the vehicle 1. Next, an example of this control procedure will be described.

Control on Travelling (Driving)

Figure 5:
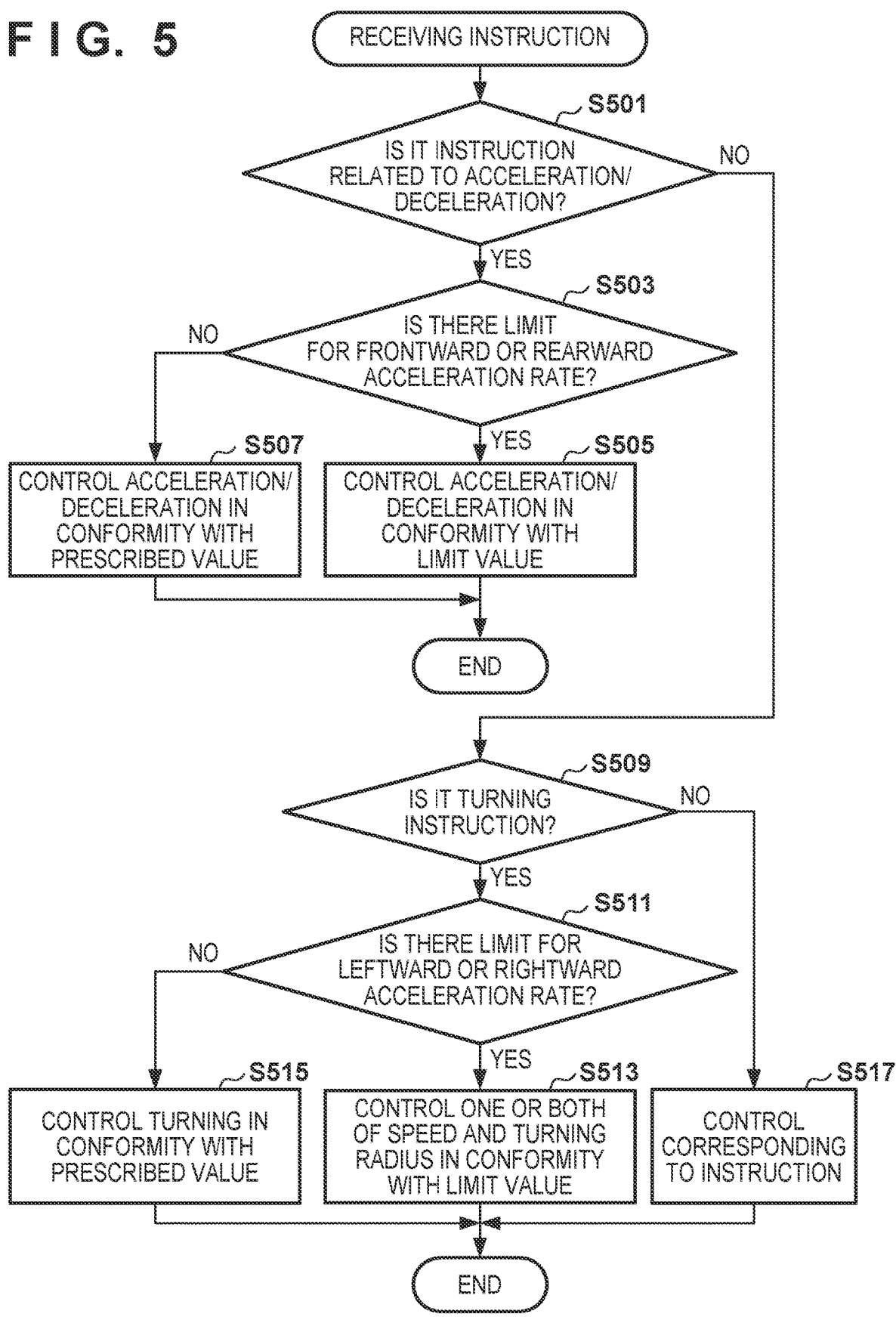
FIG. 5 is a flowchart showing an example of control during acceleration/deceleration and turning of the vehicle according to an embodiment.

FIG. 5 shows one example of a control procedure that is executed by the ECU 211 in response to an instruction from the autonomous control unit 201 after the vehicle 1 took off. Upon receiving the instruction, whether the received instruction is an instruction related to acceleration/deceleration is determined (step S501). When it is determined that the received instruction is the instruction related to acceleration/deceleration, whether the limit value for the frontward or rearward acceleration rate has been set in step S405 or S407 of FIG. 4 is determined (step S503). When the limit value has been set, acceleration/deceleration is controlled in conformity with this limit value (step S505). This control may be of an open-loop type, or may be of a closed-loop type. In the case of the open-loop type, to control acceleration and deceleration, for example, a limit on electric current to the motors is determined in advance in accordance with the limit value for the acceleration rate for the case of acceleration, and a degree of braking is determined in advance in accordance with the limit value for the acceleration rate for the case of deceleration. In the case of the closed-loop type, feedback control is performed with respect to acceleration and deceleration while detecting the frontward or rearward acceleration rate using the acceleration rate sensor.

On the other hand, when the limit value for acceleration has not been set in step S405 or S407 of FIG. 4, acceleration/deceleration is controlled in conformity with a limitation on acceleration based on a prescribed value. When there is no limitation based on a prescribed value, acceleration and deceleration may be performed in accordance with the instruction.

When it is determined that the received instruction is not the instruction related to acceleration/deceleration in step S501, whether the received instruction is a turning instruction is determined (step S509). When it is determined that the received instruction is the turning instruction, whether the limit value for the leftward or rightward acceleration rate has been set in step S413 or S415 of FIG. 4 is determined (step S511). When the limit value has been set, a turn is made while controlling one or both of the speed and the radius during the turn in conformity with this limit value (step S513). In the present example, the radius is controlled in accordance with the limit value for the acceleration rate. Furthermore, in the present embodiment, while the turn is made with the turning radius that was determined in accordance with the limit value for the acceleration rate, it is permissible to perform feedback control in which, for example, the acceleration rate in the widthwise direction is monitored in the middle of the turn, and the speed is lowered if the monitored acceleration rate exceeds the limit value for the acceleration rate.

On the other hand, when the limit value for acceleration has not been set in step S413 or S415 of FIG. 4, turning is controlled in conformity with a limitation on acceleration based on a prescribed value. When there is no limitation based on a prescribed value, a turn may be made in accordance with the instruction (e.g., with the instructed radius and speed). When the received instruction is neither acceleration/deceleration nor turning, control corresponding to the instruction is performed (step S517). For example, when a takeoff instruction has been received, the procedure of FIG. 4 is executed in step S517.

Figure 6A:
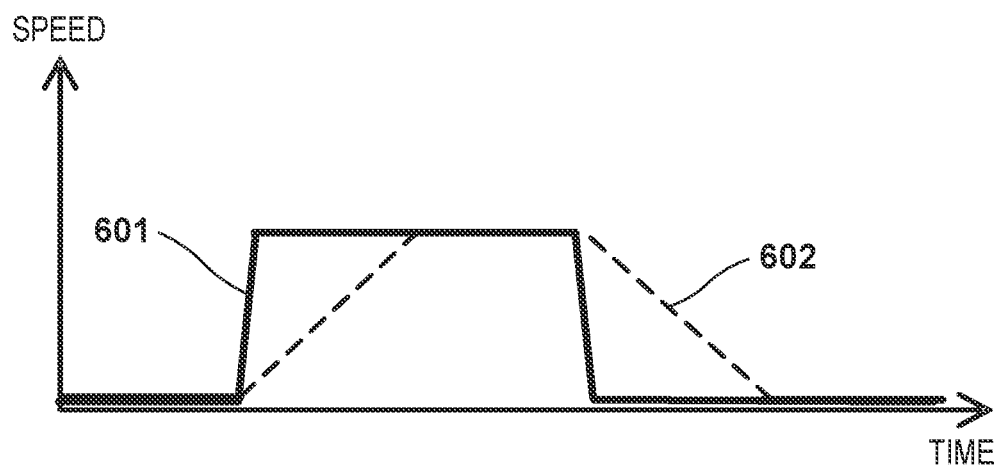
FIG. 6A is a diagram showing examples of a speed and a turning angle during acceleration/deceleration of the vehicle according to an embodiment.
Figure 6B:
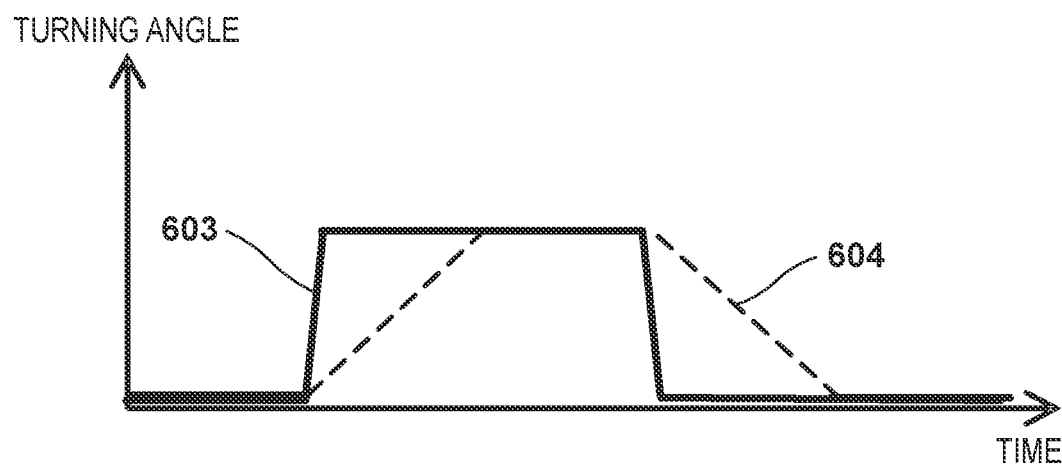
FIG. 6B is a diagram showing examples of a speed and a turning angle during turning of the vehicle according to an embodiment.

FIGS. 6A and 6B show examples of a limitation on the acceleration rate. FIG. 6A shows an example of control on acceleration/deceleration. In FIG. 6A, a solid line indicates a relationship between a directed speed 601 from the autonomous control unit 201 and time. A dash line indicates a relationship between an actual speed 602 according to the ECU 211 and time. As shown in FIG. 4, the limit value for the acceleration rate is set with respect to one of the frontward and rearward directions in accordance with the position of the center of mass of freight; however, for the sake of explanation, FIG. 6A shows an example in which the limit value for the acceleration rate has been set with respect to both of the frontward and rearward directions. Absolute values of the acceleration rates of the actual speed 602 during acceleration and during deceleration are smaller than absolute values of the acceleration rates of the directed speed 601. In this way, control is performed so that the instructed acceleration rate is overwritten with the actual acceleration rate. As a result, the frontward/rearward acceleration rate in the longitudinal direction is alleviated, and collapsing of freight during travel is not likely to occur.

FIG. 6B shows an example of control on turning. Turning angles of FIG. 6B may have values indicating absolute directions, rather than relative directions in relation to the vehicle. For example, zero denotes the direction of movement of the vehicle 1 before turning, and indicates a direction based thereon. That is to say, FIG. 6B illustrates the following situation: the vehicle that was moving straight changed its direction by turning, then moved straight, and thereafter turned in the opposite direction to move straight in the original direction. In FIG. 6B, a solid line indicates a relationship between a directed angle 603 from the autonomous control unit 201 and time. A dash line indicates a relationship between an actual angle 604 according to the ECU 211 and time. As shown in FIG. 4, the limit value for the acceleration rate is set with respect to one of the leftward and rightward directions in accordance with the position of the center of mass of freight; however, for the sake of explanation, FIG. 6B shows an example in which the limit value for the acceleration rate has been set with respect to both of the leftward and rightward directions. Turning with the actual angle 604 has a small change in the turning angle relative to time, meaning that its turning radius is small compared to turning with the directed angle. In this way, control is performed so that the instructed turning angle (or turning radius) is overwritten with the actual turning angle (or turning radius). As a result, the leftward/rightward acceleration rate in the widthwise direction is alleviated, and collapsing of freight during travel is not likely to occur.

As described above, collapsing of freight during travel can be prevented by limiting the acceleration rate in the frontward, rearward, leftward, or rightward direction in accordance with the position of the center of mass of freight. Note that as the limit value for the acceleration rate, one value may be determined and set, but it is also permissible to set continuous values or discrete values in accordance with the amount of displacement between the position of the center of mass of the vehicle and the position of the center of mass of freight.

Control During Uphill Travel and Downhill Travel

Figure 8:
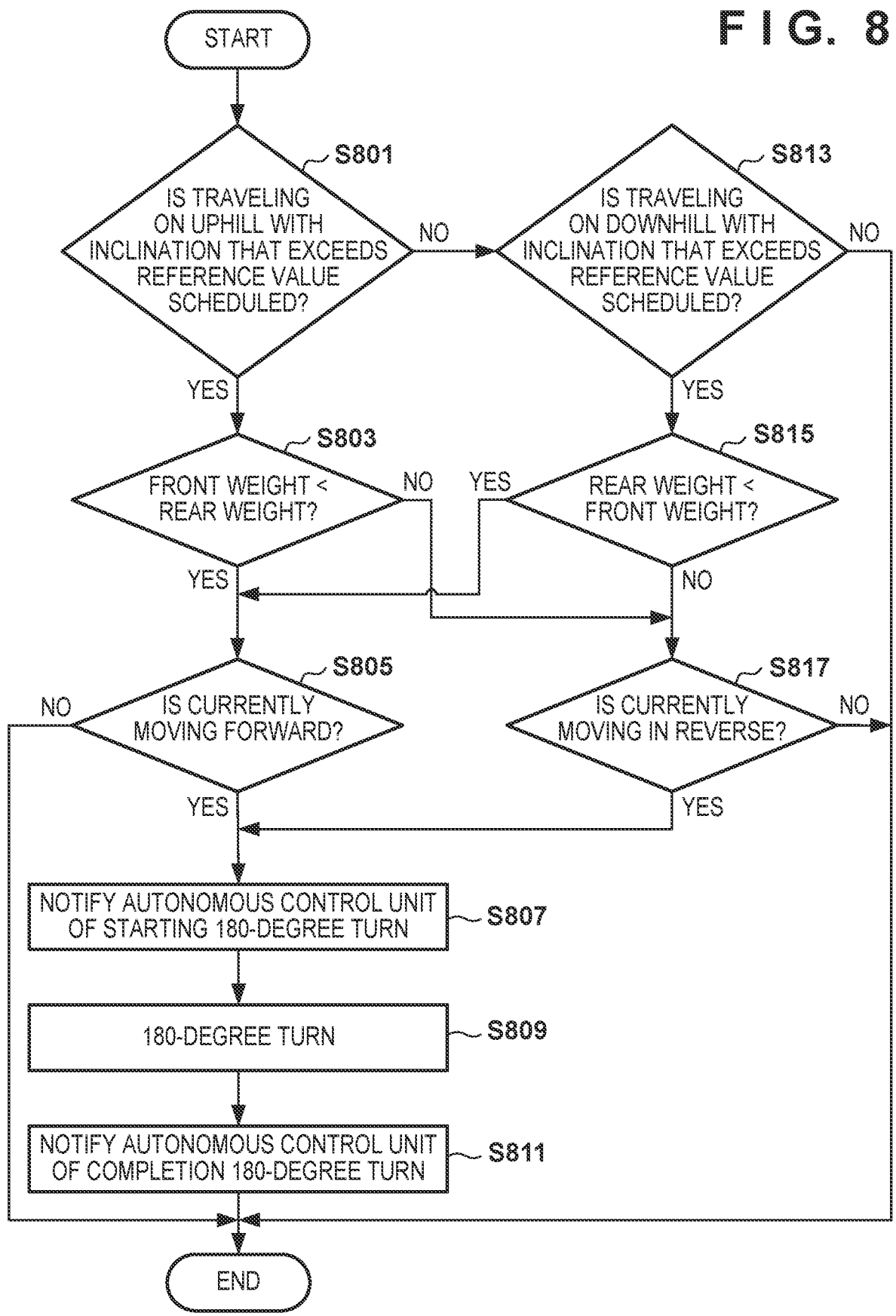
FIG. 8 is a flowchart showing an example of control during uphill travelling and downhill travelling of the vehicle according to an embodiment.

The vehicle 1 according to the present embodiment can execute a procedure in which collapsing of freight is more unlikely to occur during uphill travel and during downhill travel, in addition to the above-described control on the acceleration rate. This control achieves uphill travel and downhill travel in a state where the position of the center of mass of freight has been moved to a higher position. FIG. 8 shows one example of this control procedure executed by the ECU 211. The procedure of FIG. 8 is executed by the ECU 211 in response to an instruction that has been issued from the autonomous control unit 201 and indicates that uphill travel or downhill travel is scheduled. When images in the direction of movement that have been obtained from the map information or the camera indicate that a hill with an inclination that exceeds a reference value exists in the direction of movement, the autonomous control unit 201 transmits, to the ECU 211, an instruction indicating that uphill travel or downhill travel is scheduled depending on whether the hill is an uphill or a downhill. The procedure of FIG. 8 is executed by the ECU 211 that has received this instruction.

Upon receiving the instruction the ECU 211 determines whether the received instruction is an instruction indicating that travelling on an uphill with an inclination that exceeds the reference value is scheduled (step S801). In the case of the instruction to that effect, whether the weight of the current freight detected by the front weight sensor is lower than the weight detected by the rear weight sensor, that is to say, whether the center of mass is on the rear side, is determined (step S803). When the center of mass is on the rear side, whether the vehicle is currently moving forward is determined (step S805). When the vehicle is currently moving forward, the center of mass of freight will be on the lower side of the inclination relative to the center of mass of the vehicle on an uphill road ahead. Thus, the direction will be changed by 180 degrees; however, as it is not possible to immediately follow an instruction from the autonomous control unit 201 during the direction change, first, the autonomous control unit 201 is notified of the plan to make the 180-degree turn (step S807). Thereafter, the 180-degree turn is made (step S809), and the autonomous control unit 201 is notified of the completion of the turn (step S811).

Note that in the case of the crawler belt vehicle of the present embodiment, the 180-degree turn may be made by way of a pivot turn in which the turn is made while a crawler on one side is stopped, or by way of a spin turn in which the left and right crawlers are moved in the opposite directions. Furthermore, the completion of the turn may be determined using the azimuth sensor. After the turn, the vehicle continues to travel in the direction of movement before the turn. That is to say, when the vehicle was moving forward before the turn, the vehicle moves in reverse after the turn; when the vehicle was moving in reverse, the vehicle moves forward after the turn.

On the other hand, when it is determined that the front weight is equal to or larger than the rear weight, that is to way, when it is determined that the center of mass is on the front side in step S803, whether the vehicle is currently moving in reverse is determined (step S817). When the vehicle is currently moving in reverse, the center of mass of freight will be on the lower side of the inclination relative to the center of mass of the vehicle on an uphill road ahead. Therefore, when the vehicle is currently moving in reverse, processing branches off to step S807 and a 180-degree turn is made, thereby bringing the position of the center of mass toward the direction of movement.

On the other hand, when it is determined that the received instruction is not the instruction indicating that travelling on an uphill with an inclination that exceeds the reference value is scheduled in step S801, whether the received instruction is an instruction indicating that travelling on a downhill with an inclination that exceeds the reference value is scheduled is determined (step S813). In the case of the instruction to that effect, whether the weight of the current freight detected by the rear weight sensor is lower than the weight detected by the front weight sensor, that is to say, whether the center of mass is on the front side, is determined (step S815). When the center of mass is on the front side, whether the vehicle is currently moving forward is determined (step S805). When the vehicle is currently moving forward, the center of mass of freight will be on the lower side of the inclination relative to the center of mass of the vehicle on a downhill road ahead. Therefore, processing branches off to step S807, and the direction is changed by 180 degrees. On the other hand, when it is determined that the center of mass is on the rear side in step S815, processing branches off to step S817, and whether the vehicle is currently moving in reverse is determined. When the vehicle is currently moving in reverse with the center of mass on the rear side, the center of mass of freight will be on the lower side of the inclination relative to the center of mass of the vehicle on a downhill road ahead. Therefore, processing branches off to step S807, and the direction is changed by 180 degrees.

In the above-described manner, control is performed so that the direction of movement of the vehicle is changed by 180 degrees, thereby bringing the center of mass of freight to a position higher than the center of mass of the vehicle. Note that when the 180-degree turn has been made through the procedure of FIG. 8, driving thereafter may be executed with the transmission of an instruction pursuant to the reversed direction of movement from the autonomous control unit 201, or after converting an instruction received by the ECU 211 into an instruction pursuant to the reversed direction of movement.

[Modification Example of First Embodiment]

Figure 7:
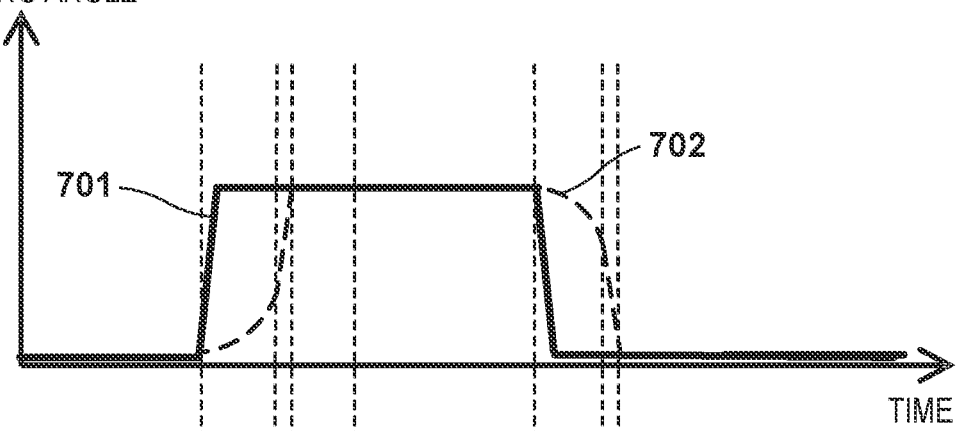
FIG. 7 is a diagram showing other examples of a speed and a turning angle during turning of the vehicle according to an embodiment.
Figure 7:
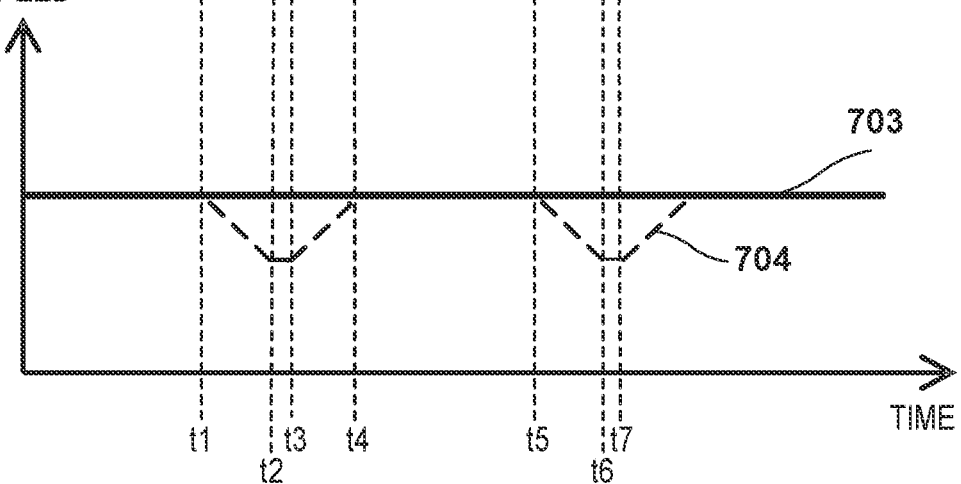

FIG. 7 shows a modification example of the control illustrated by the above-described embodiment, especially FIG. 5 and FIGS. 6A and 6B. In the present modification example, a limitation on the acceleration rate during a turn is realized by adjusting not only the turning radius but also the speed. In the above-described embodiment, the turning radius is adjusted in accordance with the limit value for the leftward or rightward acceleration rate. However, there is a possibility that changing the turning radius leads to deviation from a path set by the autonomous control unit 201. In view of this, in order to reduce the amount of this deviation, the speed is reduced to bring the turning radius as close as possible to an instruction in the present modification example. FIG. 7 is one example showing the changes in the turning angle and the speed during a turn according to the present modification example. An upper graph shows the turning angle, whereas a lower graph shows the speed. Furthermore, in the upper graph, a solid line indicates a directed angle 701 and a dash line indicates an actual angle 702, whereas in the lower graph, a solid line indicates a directed speed 703 and a dash line indicates an actual speed 704.

In FIG. 7, turning is started at time t1; at this time, when the limit value for the leftward or rightward acceleration rate has been set, the turning radius is increased in line with the limit value, and the speed is reduced. Note that when there is no need to increase the turning radius, there is no need to reduce the speed, either. In the example of FIG. 7, it becomes possible to turn with the instructed turning radius at the speed that is reached at time t2 after linear deceleration of the solid line. Therefore, with the reduction in the speed, a turn is made with a turning radius with which the acceleration rate becomes equal to or smaller than the limit value at the current speed. It goes without saying that the acceleration rate during deceleration is also limited by the limit value for the acceleration rate in the longitudinal direction. As mentioned earlier, the relationship among the turning radius r, the speed v, and the limit value for the acceleration rate $a_{lmt}$ is represented as $r=v^2/a_{lmt}$. As the limit value for the acceleration rate $a_{lmt}$ is a constant and the turning radius r is proportional to the square of the speed v, it is sufficient for the ECU 211 to, for example, adjust the speed of the outer and inner sprocket wheels along the turn so that r decrease in conformity with the foregoing expression while reducing the speed v at a certain rate.

From time t2 to time t3, a turn is made by controlling the turning angle as instructed while maintaining that speed. The scheduled turn is ended at time t3, and then the vehicle moves straight. Here, the vehicle accelerates from time t3 to time t4 until the original instructed speed is restored. From time t4 to time t5, the vehicle moves at the instructed speed. At time t5, an instruction for turning in the direction opposite to the direction at the time of t1 is issued. Thereafter, it is sufficient to perform control that is similar to control from time t1 to time t4, except for the turning direction. During this control, although there is no change in the speed instruction, the speed is reduced each time a turn is made, and the turning radius can be reduced in correspondence with the speed reduction.

In this way, it is possible to keep to the set limit value for the acceleration rate while preventing deviation from the instructed path as much as possible. Note that it is difficult to change the turning radius of the vehicle for which, for example, a travel path has been determined in advance; thus, in the present modification example, the instructed turning radius r is used as is, and the vehicle travels so that the acceleration rate in the sideways direction does not exceed the limit value for the acceleration rate while merely decelerating from the instructed speed. In this case, as the deceleration requires time, the autonomous control unit 201 may transmit a turning instruction a predetermined period before the turn is actually made.

Second Embodiment

The first embodiment has described control for preventing collapsing of freight while taking into consideration the planar imbalance of the center of mass. In contrast, it is desirable that the position of the center of mass in the height direction, too, be taken into consideration to prevent collapsing of freight. In view of this, in the present embodiment, the position of the center of mass of freight is specified also in the height direction. The position of the center of mass in the height direction cannot be obtained from static values of the weight sensors 18. However, the height of the position of the center of mass of freight can be estimated from a relationship between a tilt angle and a distance by which the position of the center of mass has moved when the vehicle 1 has been tilted. Therefore, in the present embodiment, when travelling on a tilted surface, the direction and the angle of the inclination thereof are detected using the inclination sensor, and the planar position of the center of mass (e.g., on FIG. 1B) is further obtained from the values of respective weight sensors 18. Then, the direction and the distance (displacement) of this position of the center of mass, from the position of the center of mass measured when the vehicle 1 was on a substantially horizontal road surface, are determined. Provided that the tilt of the vehicle 1 is θ, the displacement of the position of the center of mass is L, and the height of the center of mass is h relative to the determined direction, tan θ=L/h, and the estimation can be made based on h=L/tan θ.

Then, provided that the mass of freight is m, $mh^2$ is the moment of inertia about an axis of a surface on which freight is loaded; in the present embodiment, this moment of inertia is used as an index value of the likelihood of collapsing of freight. In the present example, when this index value exceeds a reference value, control is performed so that the acceleration rate does not exceed an upper limit corresponding to the reference value, irrespective of the frontward, rearward, leftward, and rightward directions. That is to say, acceleration/deceleration and turning are controlled so that the acceleration rate does not exceed the upper limit. Therefore, for example, the obtained moment of inertia and the reference value are compared, and when the reference value is exceeded, a limit value for the acceleration rate that is common to respective directions is set. Then, in the procedure of FIG. 5, it is sufficient to determine whether the limit value for the acceleration rate has been set in steps S503 and S511.

In the present embodiment, collapsing of freight is prevented in the above-described manner. Control during uphill travel and during downhill travel may be similar to that of the first embodiment. Note that in the above-described example, as the height of the center of mass is measured using an inclination, a jack for tilting the board may be provided below the weight sensors. By inclining the board together with the weight sensors using this jack, the position of the center of mass of freight can be estimated in the height direction even in a place with a small inclination.

[Modification Examples Common to First and Second Embodiments]

A description is now given of several modification examples that are common to the first and second embodiments.

(1) The vehicle 1 may be a wheeled vehicle that uses normal wheels as driving wheels and steered wheels, in which case there may be one electric motor for driving purpose. Instead, the vehicle 1 includes a steering mechanism for steering the steered wheels left and right. Furthermore, in place of freight or in addition to freight, a passenger may be able to board the vehicle 1.

(2) While it is assumed that the vehicle 1 can travel autonomously based on information of the map and the surroundings, a path that can be travelled may be determined in advance. For example, magnetic markers may be installed along a travel path, and the vehicle 1 may be a vehicle that travels along the path by detecting these markers. In this case, an inclination that exceeds a reference value can be specified as a two-dimensional section along this path. This can simplify a configuration necessary for autonomous driving.

(3) Although an inclination that exceeds a reference value is specified based on the position information, it may be specified based on signs. For example, when a path on which the vehicle 1 can travel includes an inclination exceeding the reference value, a sign that gives early warning of the inclination exceeding the reference value is set ahead of this inclination. The sign that gives early warning of the inclination exceeding the reference value is detected from images that have been shot by the vehicle 1 using the camera 17. When this sign has been detected, electricity is generated by operating the engine under the assumption that the vehicle will advance onto the inclination exceeding the reference value. In this way, the battery can be charged in advance when advancement onto the inclination exceeding the reference value is scheduled. Note that signs may not be visual objects that are recognized by the camera 17; for example, magnetic markers may be embedded, and they may be regarded as signs when magnetically detected. This makes it easier to predict advancement onto the inclination exceeding the reference value.

(4) Although the motors are used as a drive source in the above-described embodiments, only the internal combustion engine may be used thereas.

Summary of Embodiments

The above-described present embodiments are summarized as follows.

(1) According to a first mode of the present invention, provided is a vehicle control apparatus including: a load unit for loading a load; a weight sensor for estimating a position of a center of mass of the load; a drive unit; and a control unit for controlling autonomous travelling of a vehicle by controlling the drive unit, wherein the control unit estimates a position of the center of mass of the load based on a weight measured by the weight sensor, and controls an acceleration rate of the vehicle in accordance with the position of the center of mass.

In this way, the acceleration rate of the vehicle can be limited in accordance with the position of the center of mass, and collapsing of freight can be prevented.

(2) According to a second mode of the present invention, provided is the vehicle control apparatus according to (1), wherein the control unit estimates a position of the center of mass in a direction of movement of the vehicle, and controls the acceleration rate during acceleration and/or deceleration of the vehicle in accordance with the position of the center of mass.

In this way, the acceleration rate during acceleration/deceleration can be limited in accordance with the position of the center of mass in the front-and-rear direction of the vehicle, and collapsing of freight can be prevented during acceleration/deceleration.

(3) According to a third mode of the present invention, provided is the vehicle control apparatus according to (2), wherein the control unit limits the acceleration rate during deceleration of the vehicle when the position of the center of mass is anterior to a center of mass of the vehicle, and limits the acceleration rate during acceleration of the vehicle when the position of the center of mass is posterior to the center of mass of the vehicle.

In this way, the acceleration rate during acceleration/deceleration can be limited in accordance with the position of the center of mass in the front-and-rear direction of the vehicle, and collapsing of freight can be prevented during acceleration/deceleration.

(4) According to a fourth mode of the present invention, provided is the vehicle control apparatus according to any one of (1) to (3), wherein the control unit estimates a position of the center of mass in a direction perpendicular to a direction of movement of the vehicle, and controls the acceleration rate during turning of the vehicle in accordance with the position of the center of mass.

In this way, the acceleration rate during a turn can be limited in accordance with the position of the center of mass in the front-and-rear direction and the left-and-right direction of the vehicle, and collapsing of freight can be prevented during a turn.

(5) According to a fifth mode of the present invention, provided is the vehicle control apparatus according to (4), wherein the control unit limits the acceleration rate during rightward turning of the vehicle when the position of the center of mass is on the right of a center of mass of the vehicle, and limits the acceleration rate during leftward turning of the vehicle when the position of the center of mass is on the left of the center of mass of the vehicle.

In this way, the acceleration rate during a turn can be limited in accordance with the position of the center of mass in the front-and-rear direction and the left-and-right direction of the vehicle, and collapsing of freight can be prevented during a turn.

(6) According to a sixth mode of the present invention, provided is the vehicle control apparatus according to (4) or (5), wherein the control unit limits the acceleration rate during turning of the vehicle by adjusting one or both of a turning radius and a turning speed.

In this way, the acceleration rate during a turn can be limited while maintaining a travelling trajectory, while maintaining a travelling speed, or while changing both of them during a turn, and collapsing of freight can be prevented during a turn.

(7) According to a seventh mode of the present invention, provided is the vehicle control apparatus according to (1), wherein the control unit estimates a position of the center of mass in a height direction, and controls the acceleration rate during acceleration and/or deceleration of the vehicle in accordance with the position of the center of mass.

In this way, the acceleration rate can be limited in accordance with the height of the center of mass of the load, and collapsing of freight can be prevented.

(8) According to an eighth mode of the present invention, provided is a vehicle control apparatus including: a load unit for loading a load; a weight sensor for estimating a position of a center of mass of the load; a drive unit; and a control unit for controlling autonomous travelling of a vehicle by controlling the drive unit, wherein the control unit estimates a position of the center of mass of the load based on a weight measured by the weight sensor, and controls a direction of movement when the vehicle travels uphill or downhill on an inclination in accordance with the position of the center of mass.

In this way, on a sloping road, the vehicle can travel in a state where the position of the center of mass is on the upper side of the slope, and collapsing of freight can be prevented.

(9) According to a ninth mode of the present invention, provided is the vehicle control apparatus according to (8), wherein the control unit estimates a position of the center of mass in the direction of movement of the vehicle, and controls the direction of movement of the vehicle so that the position of the center of mass is higher than a position of a center of mass of the vehicle during uphill travel or downhill travel.

In this way, both during uphill travel and during downhill travel, the vehicle can travel in a state where the position of the center of mass remains on the upper side of the slope, and collapsing of freight can be prevented.

(10) According to a tenth mode of the present invention, provided is the vehicle control apparatus according to (9), wherein when a position of the center of mass is lower than a position of the center of mass of the vehicle during uphill travel or downhill travel in a current direction of movement, the control unit causes the vehicle to turn so as to directionally reverse a front and a rear of the vehicle, and controls travelling of the vehicle so that the vehicle travels in the same direction as before turning.

In this way, while travelling, the vehicle can be reversed so that the position of the center of mass is on the upper side of the slope, and collapsing of freight can be prevented.

The invention is not limited to the foregoing embodiments, and various variations/changes are possible within the spirit of the invention.

What is claimed is:

1. A vehicle control apparatus, comprising:
    a board for loading a load;
    a weight sensor for estimating a position of a center of mass of the load;
    a drive unit; and
    a control unit for controlling autonomous travelling of a vehicle by controlling the drive unit,
    wherein the control unit estimates a position of the center of mass of the load based on a weight measured by the weight sensor, and controls an acceleration rate of the vehicle in accordance with the position of the center of mass, and
    wherein the control unit limits the acceleration rate during deceleration of the vehicle and does not limit the acceleration rate during acceleration of the vehicle when the position of the center of mass estimated by the weight sensor is anterior to a center of mass of the vehicle, and limits the acceleration rate during acceleration of the vehicle and does not limit the acceleration rate during deceleration of the vehicle when the position of the center of mass estimated by the weight sensor is posterior to the center of mass of the vehicle.

2. The vehicle control apparatus according to claim 1, wherein the control unit estimates a position of the center of mass in a direction perpendicular to a direction of movement of the vehicle, and controls the acceleration rate during turning of the vehicle in accordance with the position of the center of mass.

3. The vehicle control apparatus according to claim 2, wherein the control unit limits the acceleration rate during rightward turning of the vehicle when the position of the center of mass is on the right of a center of mass of the vehicle, and limits the acceleration rate during leftward turning of the vehicle when the position of the center of mass is on the left of the center of mass of the vehicle.

4. The vehicle control apparatus according to claim 2, wherein the control unit limits the acceleration rate during turning of the vehicle by adjusting one or both of a turning radius and a turning speed.

5. The vehicle control apparatus according to claim 1, wherein the control unit estimates a position of the center of mass in a height direction, and controls the acceleration rate during acceleration and/or deceleration of the vehicle in accordance with the position of the center of mass.

6. A vehicle control apparatus, comprising:
    a board for loading a load;
    a weight sensor for estimating a position of a center of mass of the load;
    a drive unit; and
    a control unit for controlling autonomous travelling of a vehicle by controlling the drive unit,
    wherein the control unit estimates a position of the center of mass of the load based on a weight measured by the weight sensor, and controls a direction of movement when the vehicle travels uphill or downhill on an inclination in accordance with the position of the center of mass, and
    wherein when a position of the center of mass estimated by the weight sensor is lower than a position of the center of mass of the vehicle during uphill travel or downhill travel in a current direction of movement, the control unit causes the vehicle to turn so as to directionally reverse a front and a rear of the vehicle, and controls travelling of the vehicle so that the vehicle travels in the same direction as before turning.

* * * * *